United States Patent [19]
Leininger et al.

[11] Patent Number: 5,586,587
[45] Date of Patent: Dec. 24, 1996

[54] HIGH RATE PRESSURE VESSEL FILLING PROCESS

[75] Inventors: Daniel R. Leininger, Layton; Walter A. Moore, Ogden, both of Utah

[73] Assignee: Morton International, Inc., Chicago, Ill.

[21] Appl. No.: 490,186

[22] Filed: Jun. 14, 1995

[51] Int. Cl.[6] .................................................. B65B 31/00
[52] U.S. Cl. ........................... 141/196; 141/3; 141/25; 141/82; 141/83; 141/153; 141/197; 141/236; 53/503; 53/403
[58] Field of Search ............................ 141/2–4, 82, 10, 141/18, 21, 25, 27, 83, 153, 196, 197, 236, 313; 53/79, 403, 501, 503, 504

[56] References Cited

U.S. PATENT DOCUMENTS

| | | | |
|---|---|---|---|
| 1,659,384 | 2/1928 | Thomas | 141/196 X |
| 3,213,903 | 10/1965 | Armstrong | 141/82 |
| 3,604,477 | 9/1971 | Grothoff | 141/82 X |
| 3,837,377 | 9/1974 | McJones | 141/4 |
| 4,585,039 | 4/1986 | Hamilton | 141/4 X |
| 4,813,461 | 3/1989 | Fanshawe et al. | 141/4 |
| 4,999,976 | 3/1991 | Smith | 141/3 X |
| 5,006,109 | 4/1991 | Douglas et al. | 604/26 |
| 5,351,726 | 10/1994 | Diggins | 141/4 |

Primary Examiner—J. Casimer Jacyna
Attorney, Agent, or Firm—Gerald K. White

[57] ABSTRACT

The invention comprises a high rate pressure vessel filling process which improves the accuracy of filling pressure vessels to required gas mass. The approach overcomes heating effects of high rate filling and volume variation effects by slowly prefilling a series of temperature monitored and controlled cylinders of a set volume, then rapidly discharging the premeasured gas mass into the pressure vessel.

14 Claims, 1 Drawing Sheet

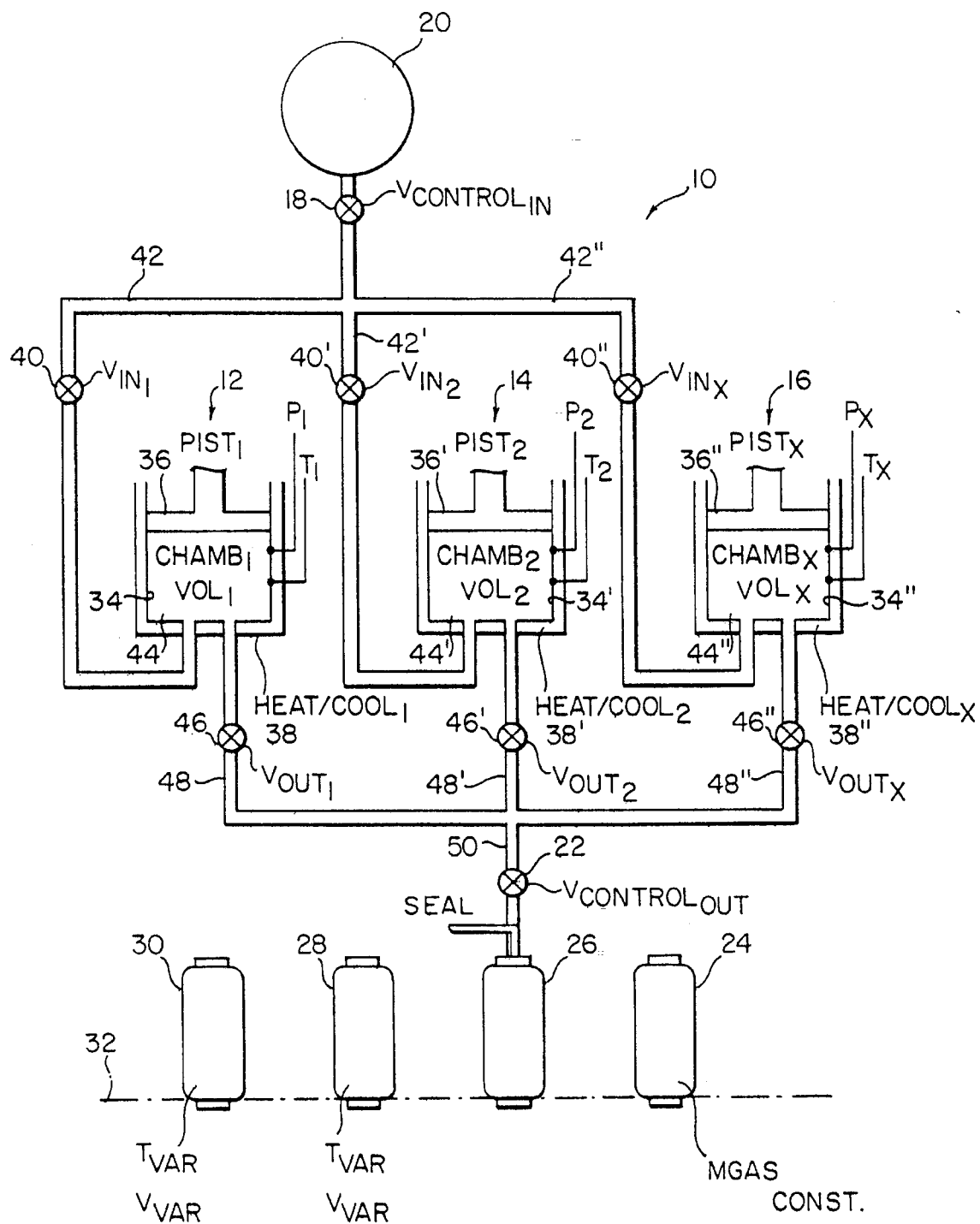

HIGH RATE PRESSURE VESSEL FILLING PROCESS

BACKGROUND OF THE INVENTION

1. Field of the Invention

This invention relates to the accurate (with respect to gas mass) high rate filling of pressurized vessels, particularly hybrid/pressurized air bag inflators, regardless of the initial temperature or volume of the pressure vessel being filled.

2. The Related Art

Present-day automotive vehicles incorporate one or more inflatable air bags for the protection of occupants in the event of a crash. The air bags are mounted in a folded compact condition in cooperative relation with a gas inflator. Upon sensing an impending vehicle crash, the inflator produces inflation gas which rapidly inflates and deploys the air bag.

Many types of inflators have been disclosed in the art for use in inflating air bags in such vehicular crash protection or safety restraint systems. One involves the utilization of a quantity of stored compressed inflation gas which is selectively released to inflate the air bag. Another derives a gas source from a combustible gas generating material which, upon ignition, generates a quantity of gas sufficient to inflate the air bag. In a third type, the air bag inflating gas results from a combination of stored compressed gas and gas generating material. The last mentioned type is commonly referred to as an augmented gas or hybrid/pressurized inflator.

The pressurized supply of gas is a very important part of a hybrid safety restraint system. The pressurized vessel typically is pressurized with an inert gas such as argon, or a mixture of argon and another inert gas, to approximately 3000 psi at room temperature. In general, the invention is applicable to compressed gases. The phrase compressed gases is understood to encompass inert, flammable and non-flammable gases, either existing alone or in certain proportions. This limit is illustrative only and is not intended in any manner to place restrictions on the scope of the claimed invention.

In the high rate filling of pressurized vessels, a procession of vessels having a variable temperature and variable volume are moved along a production line to a gas filling station. The gas filling station is required to fill each vessel with exactly the same mass of gas and to seal it in a very short cycle time. The measurement of pressure inside the vessel during the filling time to determine if the vessel is filled to the proper mass of gas is not accurate since variations in vessel temperature and volume yield different pressures at the proper mass fill point. The heating effects of high rate filling also change the gas temperature. This makes pressure measurements unreliable in establishing accurate vessel mass fill. Weighing each vessel during the fill process is also not acceptable due to interface loads of the fill machine during the high rate fill process which taint weight measurements during the fill.

There is a need and a demand for countering and correcting these problems that are encountered in the high rate filling of pressure vessels, particularly hybrid/pressurized air bag inflators, with a consistent fill mass.

SUMMARY OF THE INVENTION

An object of the invention is to provide a method of filling, at a high rate, a succession of pressure vessels where the volume and temperature of the gas going into the vessels are controlled to ensure a consistent fill mass.

Another object of the invention is to provide a high rate pressure vessel filling process which overcomes heating effects of high rate filling and volume variation effects by slowly prefilling a series of temperature monitored and controlled cylinders of fixed volume and then rapidly discharging each of the premeasured gas masses into a separate pressure vessel to thereby improve the accuracy of filling each of the pressure vessels to a required gas mass.

A further object of the invention is to provide a method of high rate filling of pressure vessels to a required gas mass regardless of temperature or volume of the pressure vessels.

An additional object of the invention is to provide a high rate pressure vessel gas filling process which allows accurate temperature measurements and control of gas along with accurate volume setting to correlate with pressure and establish gas mass.

Still another object of the invention is to provide a high rate pressure vessel gas filling process which allows slow filling of the control volume as established by a piston/cylinder assembly while allowing short cycle time on vessel gas fill through the use of multiple piston/cylinder assemblies.

It is also an object of the invention to provide a high pressure vessel gas filling process that allows more repeatable fill weights for air bag hybrid pressurized or stored gas inflators.

These and other objectives of the invention are accomplished by filling a desired mass of gas into a cylinder, more specifically controlling/monitoring the gas temperature in the cylinder and then filling the cylinder to the appropriate pressure relating to the temperature through the perfect gas law:

$$PV = nRT$$

where
- P—pressure
- V—volume
- n—number of moles of gas
- R—universal gas constant
- T—temperature The number of moles of gas required to meet the mass target is determined by the following relationship:

$$n = \frac{m}{MW}$$

where
- m—target gas mass
- MW—molecular weight of the gas

The perfect gas law can then be rearranged to yield the following relationship:

$$P = \frac{mRT}{MWV}$$

Using this relationship, the pressure can be adjusted based on the measured temperature to achieve the desired gas mass.

More particularly, the objectives of the invention are accomplished by prefilling a separate piston/cylinder piston/cylinder (PIST1/CHAMB1) assembly where the temperature is accurately controlled (HEAT1/COOL1) and monitored (T1) and the volume (V1) is set at a constant. This allows the desired gas mass to be achieved in the chamber of each piston/cylinder assembly by measuring the pressure (P1) therein and correlating it through a feedback system to the chamber temperature control (HEAT1/COOL1), the chamber temperature measurement (T1) and the chamber set volume (V1). This correlated feedback controls the gas mass into the piston/cylinder assembly through the gas-in controlling valves (V control-in and V in 1). Once the gas mass is accurately established in the piston/cylinder assembly (PIST1/CHAMB1), it is rapidly forced into the pressure vessel to be filled through gas-out controlling valves (V out 1 and V control-out) by a piston (PIST1) in the cylinder and sealed. This results in the pressure vessel being filled with an accurate mass regardless of its temperature or volume due to the mass accuracy coming out of the arrangement of the piston/cylinder assembly (PIST1/CHAMB1).

Since high rate gas filling heating effects will create a temperature transient in the piston/cylinder assembly arrangement which impacts the ability to accurately determine the pressure from temperature and volume data and thereby gas mass in the piston/cylinder assembly, the gas must be introduced slowly into the assembly. In order to achieve a short pressure vessel fill cycle time, multiple piston/cylinder assemblies (PIST2/CHAMB2 through PISTx/CHAMBx) are used in the pressure vessel gas filling station machine. The piston/cylinder arrangement allows different initial volumes to be set to achieve various fill masses. The cylinder temperature can be accurately determined through multiple thermocouples (T1), which is not easily done with the pressure vessel being filled, or can be controlled by a heating/cooling jacket (HEAT1/COOL1).

The various features of novelty which characterize the invention are pointed out with particularity in the claims annexed to and forming a part of this specification. For a better understanding of the invention, its operating advantages, and specific objects attained by its use, reference is made to the accompanying drawing and descriptive matter in which a preferred embodiment of the invention is illustrated.

BRIEF DESCRIPTION OF THE DRAWING

With this description of the invention, a detailed description follows with reference being made to the accompanying drawing which forms part of the specification, and which illustrates a high rate pressure vessel gas filling station according to the invention.

DESCRIPTION OF THE PREFERRED EMBODIMENT

The high rate pressure vessel gas filling station shown in the drawing and designated by reference numeral 10 includes a plurality of prefilling piston/cylinder assemblies 12, 14 and 16. A control valve 18 controls the flow of gas from a source 20 to the filling station 10, and a control valve 22 controls the flow of gas from the filling station 10 to a procession of pressure vessels 24, 26, 28 and 30 that are moved along a production line 32 to and beyond the gas filling station 10.

The pressure vessels 24, 26, 28 and 30 may comprise hybrid/pressurized or stored gas air bag inflators. When this is the case, the source 20 of gas controlled by the valve 18 would comprise a compressed gas typically at a pressure of about 3000 psi.

The piston/cylinder prefilling assembly 12 includes a cylinder 34, a piston 36 that is positioned in sliding pumping cooperative relation within the cylinder 34, and a heating and cooling jacket 38 surrounding the cylinder 34 and within which the cylinder 34 is positioned in close cooperative temperature monitoring and controlling relationship. A control valve 40 controls the flow of gas through a conduit 42 from the control valve 18 to a chamber 44 within the cylinder 34.

The chamber 44 has a known set volume depending upon the initial position, as shown, of the piston 36 within the cylinder 34.

A control valve 46 controls the flow of gas through a conduit 48 from the chamber 44 to the control valve 22 which controls the flow of gas through a conduit 50 to the pressure vessels 24, 26, 28 and 30 as they are moved successively on the production line 32 in operative filling relation with the prefilling station 10. Measurement of the temperature T of the temperature of the cylinder 34 and thereby of the gas within chamber 44 is measured by suitable temperature measuring means (not shown) but which typically may comprise commercially available multiple thermocouples. Similarly, measurement of the pressure P at which the gas is retained in the chamber 44 is measured by means of suitable pressure measurement means (not shown).

The same reference numerals or letters that are applied in the description of the piston/cylinder prefilling assembly 12 are used in referring to the same elements embodied in the prefilling assemblies 14 and 16 except for the addition of a quotation mark (an inverted comma) to each of the reference numerals or letters that refer to the assembly 14, and the addition of two quotation marks to each of the reference numerals or letters that refer to the assembly 16.

A feature of the invention is that the volume V, V' and V" of each of the chambers 44, 44' and 44" of the respective prefilling assemblies 12, 14 and 16 is set at a constant. This allows the production of the required gas mass to be accomplished, that is, achieved in the chamber 44 of the prefilling assembly 12 by measuring the pressure P therein and correlating it through a 10 feedback technique to the chamber 44 temperature control heating and cooling jacket 38, temperature measurement T, and the set volume V. Feedback, as those skilled in the art understand, is the return of part of the output of a system into the input for purposes of modification and control of the output. This correlated feedback accurately establishes a gas mass in the chamber 44 of the piston/cylinder chamber 44 by the flow of the gas thereto through control valves 18 and 40. Each piston is calibrated individually to account for differences in volume due to different fill path lengths. Once the required gas mass is accurately established in the piston/cylinder 44 of the prefilling assembly 12, it is rapidly forced into the pressure vessel 26 through gas out control valves 46 and 22 by the piston 36. The pressure vessel 26 is then immediately sealed.

This results in the pressure vessel 26 being filled with an accurate gas mass regardless of its temperature or volume due to the mass accuracy coming out of the piston/cylinder assembly arrangement 12.

Since high rate gas filling effects will create a temperature transient in the piston/cylinder assembly arrangement, impacting the ability to accurately determine the pressure from temperature and volume data and thus gas mass in the piston/cylinder assembly, the gas must be introduced slowly into the prefilling assembly 12. To achieve a short vessel fill cycle time, multiple piston/cylinder assemblies such as the assemblies 12, 14 and 16 and additional such assemblies, if required, could be used in the filling machine at the gas filling station 10. The piston/cylinder assembly arrangement allows different initial volumes to be set to achieve various gas fill masses. The temperature of the cylinders 34, 34', 34", etc. can be accurately determined through multiple thermocouples, which is not easily done with the pressure vessels 24, 26, 28 and 30 being filled, or can be controlled by a respectively associated heating/cooling jacket 38, 38' and 38".

Thus, in accordance with the invention, there has been provided a method of filling, at a high rate, pressure vessels where the volume and temperature of the gas going into the vessels are controlled to ensure a consistent gas fill mass.

The invention allows:

(a) high rate filling of pressure vessels regardless of temperature or volume of the vessel;

(b) accurate temperature measurements and control of gas along with accurate volume setting to correlate with pressure and thereby establish gas mass;

(c) slow filling of control volume (piston/cylinder) while allowing short cycle time on vessel fill through the use of multiple piston/cylinder assemblies; and (d) more repeatable gas fill weights for hybrid/pressurized or stored gas air bag inflators.

The invention also overcomes heating effects of high rate filling.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A method of filling a pressure vessel with a required gas mass comprising, (a) flowing gas from a source thereof into a chamber having a set volume V, (b) measuring the temperature of the gas in the chamber, (c) controlling the temperature of the gas in he chamber, (d) measuring the pressure of the gas in the chamber, (e) utilizing the relationship $$P = \frac{mRT}{MWV},$$

where P is the pressure of the gas in the chamber, m is the target gas mass, MW is the molecular weight of the gas, V is the volume of the chamber, R is the universal gas constant, and T is the temperature of the gas in the chamber, correlating the measured pressure P through a feedback system to controlling the temperature of the gas in the chamber, the temperature measurement T, and the set volume V of the chamber to establish a gas mass in the chamber by the flow of gas thereinto, and (f) once the required gas mass is accurately established in the chamber, rapidly discharging the gas mass from the chamber into the pressure vessel and immediately sealing the pressure vessel.

2. A method of filling a pressure vessel as defined by claim 1 wherein the pressure vessel to be filled is a hybrid inflator.

3. A method of filling a pressure vessel, as defined by claim 2, wherein the gas being filled in the hybrid inflator is compressed gas.

4. A method of filling a pressure vessel, as defined by claim 3, wherein the compressed gas being filled in the hybrid inflator is a mixture of argon and other gases.

5. A method of filling a pressure vessel, as defined by claim 3, wherein the compressed gas being filled in the hybrid inflator is argon.

6. A method of filling a pressure vessel with a required gas mass comprising, (a) slowly prefilling a temperature monitored and controlled constant volume cylinder assembly to ensure a consistent gas fill mass, wherein, in step (a), the temperature monitored and controlled constant volume cylinder assembly comprises a piston/cylinder assembly with the temperature of the cylinder accurately controlled by a surrounding HEAT/COOL jacket and monitored, and the initial position of the piston in the cylinder determines the constant volume of the chamber within the cylinder, which allows the required gas mass to be achieved in the cylinder chamber by measuring the pressure therein and correlating it through a feedback system to the chamber temperature control, temperature measurement and the set cylinder chamber volume, (b) rapidly discharging the premeasured gas mass into the pressure vessel, and (c) immediately sealing the pressure vessel after the premeasured gas mass is discharged into the pressure vessel.

7. A method of filling a pressure vessel with a required gas mass as defined by claim 6, wherein, in step (a), the correlated feedback controls by the adjustment of gas-in valves the flow of gas mass into the constant volume chamber of the piston/cylinder assembly from a suitable gas source, whereby, once accurately established in the constant volume chamber of the cylinder assembly, the gas mass is forced into the pressure vessel through gas-out controlling valves by the piston.

8. An accurate process, with respect to gas mass for filling a procession of vessels having a variable temperature and a variable volume that are moved along a production line to a gas filling station machine that is provided to fill each of such vessels with exactly the same mass of gas and seal it in a short cycle time, comprising the steps of (a) prefilling a separate piston/cylinder chamber (PIST1/ CHAMB1) where the temperature is accurately controlled and monitored and the cylinder chamber set at a constant volume, which prefilling allows the required gas mass to be achieved in the cylinder chamber by measuring the cylinder chamber pressure and correlating it through a feedback system to the cylinder chamber temperature control, chamber temperature measurement and the chamber set volume, which correlated feedback controls through input control valves the flow of a gas mass from a source thereof into the piston/ cylinder chamber, (b) once the required gas mass is accurately established in the piston/cylinder chamber, opening gas-out controlling valves between the piston/cylinder chamber and the vessel to be filled and rapidly forcing, by the piston, the gas mass into the vessel, and (c) sealing the vessel, whereby the vessel is filled with an accurate gas mass regardless of its temperature or volume due to the gas mass accuracy coming out of the piston/cylinder chamber.

9. An accurate process, as defined by claim 8 including a further step, as follows:

(d) for achieving a short vessel fill cycle time, providing multiple piston/cylinder chamber assemblies (PIST1/CHAMB1 through PISTx/CHAMBx) in the gas filling station machine.

10. An accurate process, as defined by claim 9, wherein step (a) is modified to allow different initial chamber volumes to be set to achieve various gas fill masses.

11. An accurate process, as defined by claim 9, wherein in step (a) the cylinder temperatures are determined through the use of multiple thermocouples and are controlled by heating/cooling jackets.

12. An accurate process, as defined by claim 8, wherein in step (a) multiple piston/cylinder chamber assemblies (PIST1/CHAMB1 through PISTx/CHAMBx) are used in the gas-filling machine, which arrangement allows different initial volumes to be set to achieve various fill masses into the procession of vessels.

13. An accurate process, as defined by claim 12, wherein in step (a) the cylinder temperature of the multiple piston/cylinder chamber assemblies are determined through the use of multiple thermocouples and are controlled by heating/cooling jackets.

14. A pressure vessel filling process which improves the accuracy of filling pressure vessels having variable temperature and a variable volume to a required gas mass comprising the steps of:

(a) slowly prefilling with gas a piston/cylinder chamber where the temperature is accurately controlled and monitored and the cylinder chamber volume is set at a constant value, which prefilling allows the required gas mass to be achieved in the cylinder chamber by measuring the chamber pressure and correlating it through a feedback system to the cylinder chamber temperature control, chamber temperature measurement, and the chamber set volume, which correlated feedback controls the flow of a mass of gas from a source thereof into the piston/cylinder chamber, (b) once the required gas mass is accurately established in the piston/cylinder chamber, opening a gas mass path between the piston/cylinder chamber and the pressure vessel to be filled, and rapidly forcing the gas mass from the piston/cylinder chamber into the pressure vessel by the piston, and (c) immediately sealing the pressure vessel.

* * * * *